(Model.)

R. GURNEY.
DRAG SAW.

No. 322,596. Patented July 21, 1885.

WITNESSES:
Chas Nida
C. Sedgwick

INVENTOR:
R. Gurney
BY Munn & Co
ATTORNEYS.

200~# UNITED STATES PATENT OFFICE.

ROBERT GURNEY, OF KIRKWOOD, MISSOURI.

DRAG-SAW.

SPECIFICATION forming part of Letters Patent No. 322,596, dated July 21, 1885.

Application filed January 20, 1885. (Model.)

*To all whom it may concern:*

Be it known that I, ROBERT GURNEY, of Kirkwood, in the county of St. Louis and State of Missouri, have invented certain new and useful Improvements in Hand-Power Sawing-Machines, of which the following is a full, clear, and exact description.

Reference is to be had to the accompanying drawings, forming part of this specification, in which similar letters of reference indicate corresponding parts in both the figures.

Figure 1:
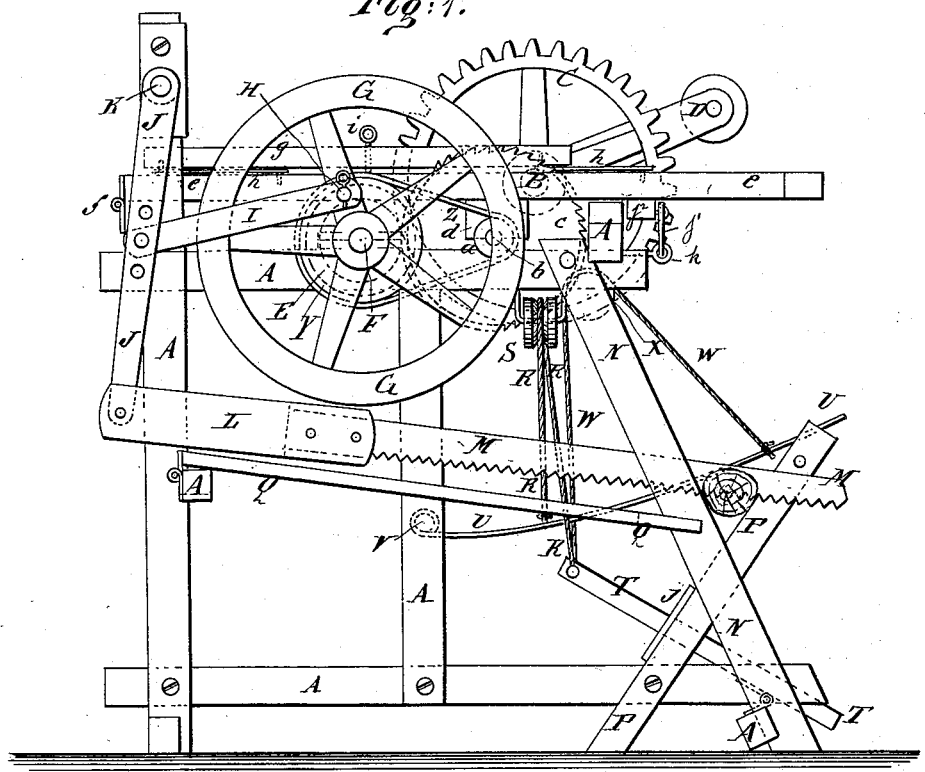
Figure 2:
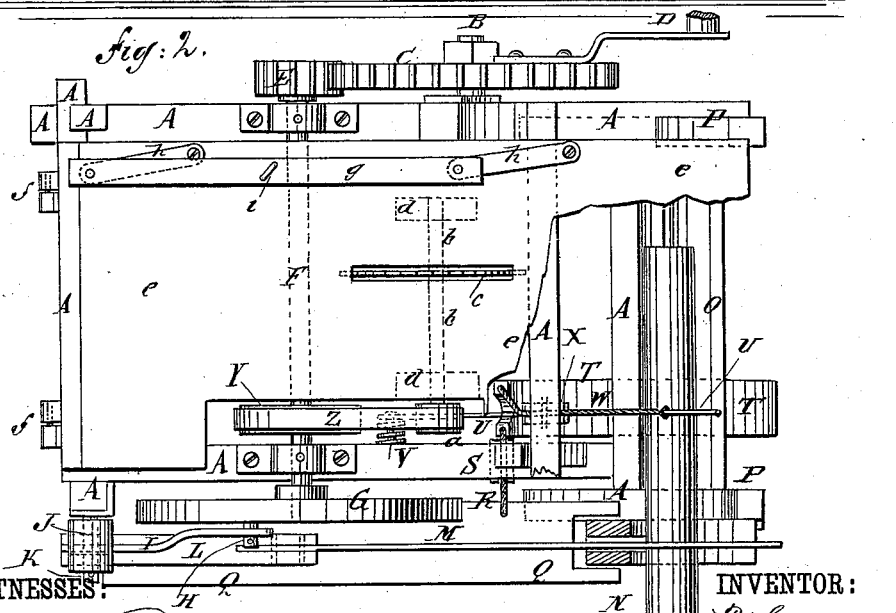

Figure 1 is a side elevation of one of my improved sawing-machines. Fig. 2 is a plan view of the same, parts being broken away.

The object of this invention is to provide hand-power sawing-machines for sawing stove wood, ripping lumber, and doing other desired sawing, and which shall be simple in construction, convenient in use, easily operated, and effective in operation.

The invention consists in the construction and arrangement of parts, as will be hereinafter fully described and claimed.

A is the frame of the machine, the sides and rear of which are vertical and the front is inclined to the rearward, as shown in the drawings. One of the inclined front posts of the frame A is extended upward, and to it is attached a gudgeon, B, upon which revolves a large gear-wheel, C. The gear-wheel C is provided with a crank-handle, D, and its teeth mesh into the teeth of the small gear-wheel E, attached to the end of the shaft F. The shaft F revolves in bearings attached to the top side bars of the frame A. To the other end of the shaft F is attached a fly-wheel, G, provided with a crank-pin, H, to which is pivoted the end of a connecting-bar, I. The other end of the bar I is pivoted to the middle part of the swinging bar J, several holes being formed in the said swinging bar to receive the pivoting-pin, so that the said connecting-bar can be readily adjusted to regulate the throw of the said swinging bar. The upper end of the bar J is pivoted to a gudgeon, K, attached to the upwardly-extending end of a rear post of the frame A.

To the lower end of the swinging bar J is hinged the end of an arm, L, to the forward end of which is attached the saw M. The arm L is made sufficiently heavy to hold the saw M down to its work with such a force as to cause it to cut rapidly.

I prefer to use a saw having teeth so formed that the saw will cut when moving in either direction; but the teeth may be so formed as to cut only when the saw is moving in one direction.

The forward part of the saw M passes through a guide-slot in the bar N, placed parallel with the inclined front posts of the frame A, and attached to the projecting ends of the front cross-bars of the said frame A.

The stick of wood to be sawed rests in a triangular trough formed by a front cross-bar of the frame A, and a board or bar, O, the ends of which are secured to the upper ends of bars P placed in forwardly-inclined positions and attached to the rearwardly-inclined front posts of the frame A and to the side base-bars of the said frame.

To the projecting end of the central rear cross-bar of the frame A is hinged the end of a board, Q, which projects forward beneath the arm L and saw M, and is supported in such a position as to receive the arm L when the stick being sawed is cut off, and prevent the saw from dropping to the ground, the said arm L resting and sliding upon the said board Q and holding the saw-teeth out of contact with the said board, so that the saw will not be injured should the motion of the machine be continued. The forward end of the board Q is slotted to receive the guide-bar N, so that the said forward end will be kept in the same vertical plane.

To the forward part of the hinged board Q is attached the end of a cord or chain, R, which passes over a guide-pulley, S, pivoted to a support attached to a top side bar of the frame A. The other end of the cord R is attached to the upper end of the treadle T, which is hinged at its lower end to the bottom front cross-bar of the frame A. With this construction, when the stick of wood has been cut off, the operator, by pressing the treadle T downward with his foot, can raise the board Q, and with it the saw-arm L and the saw M, so that the said saw M will be out of the way in moving the stick forward for another cut or replacing it, when sawed up, by another stick. The stick is held down while being sawed by a spring, U, the lower end of which is coiled around a pin, V, attached to a post of the frame A, or is otherwise secured to the said post. To the forward part of the spring U is attached the end of a cord or chain, W, which passes over a pulley, X, pivoted to a support attached to the front top bar of the frame A. The other end of the cord W is attached to the upper end of the treadle T, so that the spring-holder U will be raised by operating the said treadle to release the stick being sawed and allow it to be readily adjusted for another cut or replaced by another stick. With this construction the saw M and the spring-holder U will both be raised at the same time and by the same operation. The saw M and the spring-holder U are secured in a raised position by swinging the treadle T laterally, to cause it to engage with the catch-plate $j$ attached to the inclined bar P.

To the shaft F is attached a large pulley, Y, around which passes an endless belt, Z. The belt Z also passes around a small pulley, $a$, attached to the mandrel $b$, to which is attached a circular saw, $c$. The saw-mandrel $b$ revolves in bearings $d$, attached to the lower side of the table $e$, through a slot in which the saw $c$ projects. The table $e$ is hinged at its rear end to the rear top bar of the frame A, and is secured in front by a hook, $j'$, and staple $k$, so that when the belt Z is thrown off the said table and with it the saw and saw-mandrel can be turned back out of the way.

The hinges $f$ that connect the table $e$ with the frame A are made separable in the manner of door-butts, so that the said table and its attachments, when not required for use, can be readily detached from the frame A.

The table $e$, when the circular saw $c$ is in use, is held against the draft strain of the belt $z$ by a cross-bar, $j^2$, attached to the lower side of the said table, and which rests against the front cross-bar of the frame A, as shown in Fig. 1.

The saw M, when not required for use, can be disconnected from the driving mechanism by detaching the connecting-bar I from the crank-pin H of the fly-wheel G.

By this construction the crosscut-saw M and the circular saw $c$ can be used separately, or both saws can be used together, as may be required.

Upon the table $e$, and parallel with the saw $c$, is placed a guide and gage bar, $g$, to which are pivoted the inner ends of two parallel bars, $h$. The outer ends of the bars $h$ are pivoted to the top of the table $e$, so that the said bar $g$ will always be parallel with said saw $c$ to whatever distance from the said saw the said bar may be adjusted. The bar $g$ is secured in any position into which it may be adjusted by a hand-screw, $i$, passing through the said bar $g$ and into the table $e$.

Having thus described my invention, what I claim as new, and desire to secure by Letters Patent, is—

1. In a sawing-machine, the frame A, the gears C E, shaft F, pulley Y thereon within the frame, fly-wheel G thereon outside of the frame, the bar J, pivoted at its upper end to the rear vertical side bar of the frame, the rod I, connecting the bar J with a pin on the fly-wheel, the heavy bar L, and the drag-saw secured to the forward end of the same outside of the frame, the table $e$, hinged at its rear end to the rear upper end of the frame, the mandrel $b$, mounted on the under side of the table and carrying the circular saw $c$, and the pulley $a$ and the belt Z, connecting pulleys Y and $a$, whereby the table and the circular saw may be swung over behind the frame when not in use without interfering with the drag-saw and its mechanism, substantially as set forth.

2. In a sawing-machine of the character described, the frame A, the gears C E, shaft F, and pulley Y thereon, in combination with the table $e$, hinged at its rear end to the upper rear end of the frame and provided with the mandrel $b$ on its under side, the saw $c$ and pulley $a$ thereon, the belt Z, connecting said pulleys, and the cross-bar $j^2$ on the under side of the table, near its forward end, in front of the front upper cross-bar of the frame A, whereby the table may be folded back, as described, and the strain on pulley $a$ be relieved by the cross-bar $j^2$, substantially as set forth.

3. The combination, in a sawing-machine, with the saw-buck and the drag-saw, of the spring-rod U, exerting a downward pressure at its free end, secured at V to the frame A, and extending transversely across the saw-buck, the cord W, passing over the pulley X on the upper forward part of the frame, and the foot-lever T, pivoted to the lower front cross-bar of the frame and connected to the cord W at its free end, substantially as set forth.

4. The combination, in a sawing-machine, with the frame A, the saw-buck N P at the front thereof, and the drag-saw M, of the board Q, pivoted to the rear end of the frame below and independent of the saw, the spring-rod U, secured at V to the frame and extending transversely across the saw-buck, the foot-lever T, pivoted to the lower forward end of the frame below the saw-buck, and the cords R W, secured, respectively, to the free ends of the board Q and spring-bar U and to the foot-lever, whereby the said cords will be simultaneously operated to raise the board Q and the spring-rod, substantially as set forth.

ROBERT GURNEY.

Witnesses:
CORTEZ A. KITCHEN,
WM. M. STEWART.